US012013929B2

(12) United States Patent
Sandoval

(10) Patent No.: US 12,013,929 B2
(45) Date of Patent: *Jun. 18, 2024

(54) STACK PIVOT EXPLOIT DETECTION AND MITIGATION

(71) Applicant: Open Text Inc., Menlo Park, CA (US)

(72) Inventor: Andrew Sandoval, San Antonio, TX (US)

(73) Assignee: OPEN TEXT INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/158,621

(22) Filed: Jan. 24, 2023

(65) Prior Publication Data

US 2023/0160860 A1 May 25, 2023

Related U.S. Application Data

(63) Continuation of application No. 17/228,478, filed on Apr. 12, 2021, now Pat. No. 11,593,473, which is a continuation of application No. 17/088,285, filed on Nov. 3, 2020, now Pat. No. 11,443,032, which is a continuation of application No. 15/952,678, filed on Apr. 13, 2018, now Pat. No. 10,853,480.

(51) Int. Cl.
| | |
|---|---|
| *G06F 21/52* | (2013.01) |
| *B01D 15/18* | (2006.01) |
| *G01N 30/20* | (2006.01) |
| *G01N 30/22* | (2006.01) |
| *G01N 30/46* | (2006.01) |
| *G01N 30/60* | (2006.01) |
| *G06F 11/36* | (2006.01) |

(52) U.S. Cl.
CPC .......... *G06F 21/52* (2013.01); *B01D 15/1885* (2013.01); *G01N 30/20* (2013.01); *G01N 30/22* (2013.01); *G01N 30/466* (2013.01); *G01N 30/6043* (2013.01); *G06F 11/3688* (2013.01); *G01N 2030/202* (2013.01); *G01N 2030/207* (2013.01); *G06F 2221/033* (2013.01)

(58) Field of Classification Search
CPC ................. G06F 21/52; G06F 11/3688; G06F 2221/033; B01D 15/1885; G01N 30/20; G01N 30/22; G01N 30/466; G01N 30/6043; G01N 2030/202; G01N 2030/207

See application file for complete search history.

(56) References Cited

U.S. PATENT DOCUMENTS

2012/0255013 A1* 10/2012 Sallam .................. G06F 21/564
726/24
2018/0349603 A1* 12/2018 Yamada ................ G06F 21/554

* cited by examiner

*Primary Examiner* — Ayoub Alata
(74) *Attorney, Agent, or Firm* — Sprinkle IP Law Group

(57) ABSTRACT

Examples of the present disclosure describe systems and methods for detecting and mitigating stack pivoting exploits. In aspects, various "checkpoints" may be identified in software code. At each checkpoint, the current stack pointer, stack base, and stack limit for each mode of execution may be obtained. The current stack pointer for each mode of execution may be evaluated to determine whether the stack pointer falls within a stack range between the stack base and the stack limit of the respective mode of execution. When the stack pointer is determined to be outside of the expected stack range, a stack pivot exploit is detected and one or more remedial actions may be automatically performed.

14 Claims, 4 Drawing Sheets

STACK PIVOT EXPLOIT DETECTION AND MITIGATION

CROSS-REFERENCE TO RELATED APPLICATIONS

This application is a continuation of, and claims a benefit of priority under 35 U.S.C. 120 of the filing date of U.S. patent application Ser. No. 17/228,478, filed Apr. 12, 2021, issued as U.S. Pat. No. 11,593,473, entitled "STACK PIVOT EXPLOIT DETECTION AND MITIGATION," which is a continuation of, and claims a benefit of priority under 35 U.S.C. 120 of the filing date of U.S. patent application Ser. No. 17/088,285, filed Nov. 3, 2020, issued as U.S. Pat. No. 11,443,032 entitled "STACK PIVOT EXPLOIT DETECTION AND MITIGATION," which is a continuation of, and claims a benefit of priority under 35 U.S.C. 120 of the filing date of U.S. patent application Ser. No. 15/952,678, filed Apr. 13, 2018, issued as U.S. Pat. No. 10,853,480, entitled "STACK PIVOT EXPLOIT DETECTION AND MITIGATION," the entire contents of which are hereby expressly incorporated by reference for all purposes.

BACKGROUND

Various forms of computer exploits utilize vulnerabilities in operating system and application code to enable attackers to gain control of process execution. As a specific example, the stack pivoting exploit enables attackers to bypass hardware protections, or to chain Return Oriented Programming (ROP) devices by tricking the victim computer into using a fake stack memory controlled by the attacker. In many instances, such exploits are undetectable exploit prevention software.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for detecting and mitigating stack pivoting exploits. In aspects, various "checkpoints" may be identified in software code. At each checkpoint, the current stack pointer, stack base, and stack limit for each mode of execution may be obtained. The current stack pointer for each mode of execution may be evaluated to determine whether the stack pointer falls within a stack range between the stack base and the stack limit of the respective mode of execution. When the stack pointer is determined to be outside of the expected stack range, a stack pivot exploit is detected and one or more remedial actions may be automatically performed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
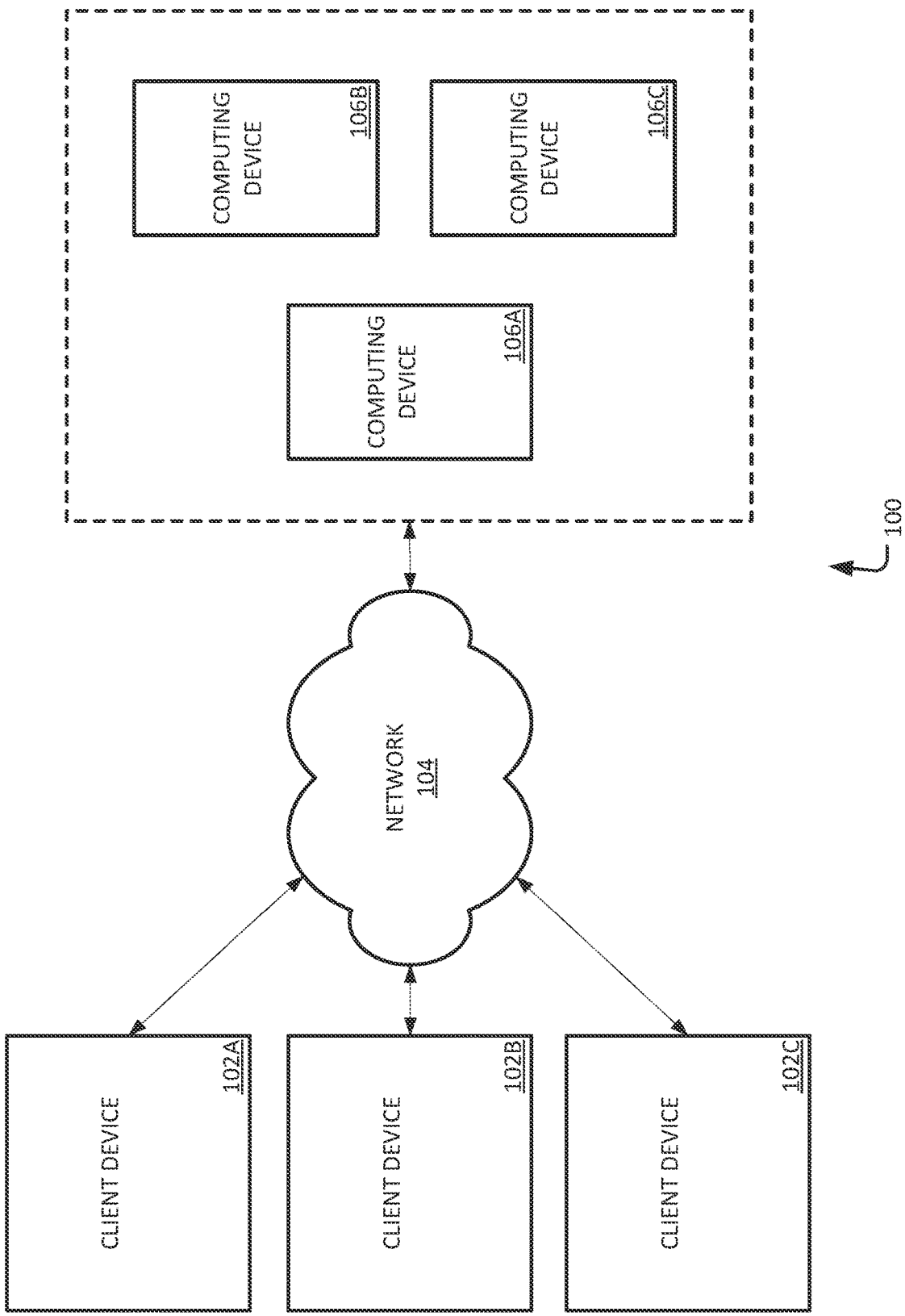
FIG. 1 illustrates an overview of an example system for detecting and mitigating stack pivoting exploits as described herein.

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

With respect to the realm of computing, the stack is a memory region used for static memory allocation. Stack pivoting is an exploit that bypasses various computer security defenses using a return-oriented programming (ROP) attack. An ROP attack enables attackers to hijack control flow of a process by gaining control of the call stack. After gaining control of the call stack, the attacker is able to execute a selection of instruction sequences (e.g., gadgets). Each gadget typically ends with a return instruction and is located within the current process or a shared library. Gadgets may be chained together to, for example, pivot from the real stack to a new fake stack generated by the attacker, and enabling the attacker to control the future flow of process execution.

To address such exploits, the present disclosure describes systems and methods for detecting and mitigating stack pivoting exploits. In aspects, one or more software code checkpoints may be determined for a process executing on a computing device. The checkpoints may include user mode checkpoints and kernel mode checkpoints. Examples of checkpoints may include process creation notification, thread creation notification, library file load (image load) notification, registry access callbacks, file system access callbacks, object manager callbacks (process and thread handle opening, duplication, etc.), virtual memory operation checks from user-mode hooks, user-mode hooks for end-point protection, etc. During execution of the process, at each checkpoint, the current stack pointer, the stack base, and the stack limit is obtained for a stack in each execution mode of the computing device. The current stack pointer may refer to a register storing the top of the stack, which generally contains the memory address following the last function call made by the thread of execution in the program. The stack base may refer to the memory address representing the "bottom of the stack" which is its highest address as stacks typically grow downward. The stack limit may refer to the memory address representing the current "ceiling of the stack" which will be its current lowest address. Together the stack base and the stack limit may represent the valid range of memory (e.g., the stack range) used for the current thread's stack. Examples of execution modes may include kernel mode, 64-bit mode, 32-bit mode, etc. Each of the current stack pointers may be evaluated to determine whether the stack pointer is within the range defined by the stack limit to the stack base for its respective stack. If one or more of the current stack pointers is outside of the corresponding range, remedial action may be taken.

Accordingly, the present disclosure provides a plurality of technical benefits including but not limited to: increasing computing environment security by preventing attackers from gaining unauthorized control of a device, detecting previously undetectable malware, evaluating process integrity over numerous checkpoints are detected or suspected, among other examples.

FIG. 1 illustrates an overview of an example system for detecting and mitigating stack pivoting exploits, as described herein. Example system 100 presented is a combination of interdependent components that interact to form an integrated whole for monitoring the security privileges of a process. Components of the systems may be hardware components or software implemented on and/or executed by hardware components of the systems. In examples, system 100 may include any of hardware components (e.g., used to execute/run operating system (OS)), and software components (e.g., applications, application programming interfaces (APIs), modules, virtual machines, runtime libraries, etc.) running on hardware. In one example, an example system 100 may provide an environment for software components to run, obey constraints set for operating, and utilize resources or facilities of the system 100, where components may be software (e.g., application, program, module, etc.) running on one or more processing devices. For instance, software (e.g., applications, operational instructions, modules, etc.) may be run on a processing device such as a computer, mobile device (e.g., smartphone/phone, tablet, laptop, personal digital assistant (PDA), etc.) and/or any other electronic devices. As an example of a processing device operating environment, refer to the example operating environments depicted in FIG. 4. In other examples, the components of systems disclosed herein may be spread across multiple devices. For instance, input may be entered or detected on a client device and information may be processed or accessed from other devices in a network, such as one or more server devices.

As one example, the system 100 comprises client devices 102A-C, distributed network 104, and a distributed server environment comprising computing devices 106A-C. One of skill in the art will appreciate that the scale of systems such as system 100 may vary and may include more or fewer components than those described in FIG. 1. In some examples, interfacing between components of the system 100 may occur remotely, for example, where components of system 100 may be spread across one or more devices of a distributed network.

In aspects, client devices 102A-C may individually incorporate or have access to exploit prevention software. The exploit prevention software may be installed on each of client devices 102A-C, or aspects of the exploit prevention software may be distributed across one or more of client devices 102A-C. The exploit prevention software may be configured to provide multi-vector protection and threat intelligence services for endpoints and networks by detecting, monitoring, preventing, and/or mitigating malware attacks and suspected threats. In examples, the exploit prevention software may identify, or facilitate the identification of, one or more software code and/or process execution checkpoints. Examples of checkpoints may include process creation events, thread creation events, library file load (image load) events, registry access events, file system access events, object manager events (process and thread handle opening, duplication, etc.), virtual memory operation checks from user-mode hooks, user-mode hooks for endpoint protection, etc. During process execution, at each identified checkpoint, information for a process may be obtained from one or more sources, such as a thread information block, a process environment block, or the like. Such sources may be data structures storing information related to the currently executing thread and/or process. The information may include, for example, process/thread identifier, current stack pointer, stack base pointer, stack limit pointer, startup parameters, operating system variables, etc. Client devices 102A-C may collect the identified information and/or store the identified information in one or more storage locations.

In aspects, client devices 102A-C may be configured to evaluate the identified information. In other aspects, client devices 102A-C may provide the identified information to a separate device or service to be evaluated. For example, client devices 102A-C may use network 104 to provide the identified information to the distributed server environment comprising computing devices 106A-C. Computing devices 106A-C may have comprised, or have access to, one or more evaluation mechanisms. In some aspects, evaluating the identified information may include using one or more evaluation mechanisms to apply one or more rule sets, models or algorithms to the identified information. A model, as used herein, may refer to a predictive or statistical machine learning component that may be used to determine a probability distribution over one or more character sequences, classes, objects, result sets or events, and/or to predict a response value from one or more predictors. A model may be a rule-based model, a machine learning regressor, a machine-learning classifier, a neural network, or the like. In such aspects, the evaluation mechanisms may compare at least a portion of the identified information to one or more threshold values. As a specific example, a stack pointer address may be compared to a stack base pointer address, a stack limit address, and/or a stack range. Based on the comparison, the evaluating device(s) may perform (or cause the performance of) one or more remedial actions. Examples of remedial actions may include generating and displaying warnings and/or notifications, terminating one or more processes, modifying a set of permissions or privilege levels, quarantining one or more files, initiating (locally or remotely) anti-exploit software/services, etc.

Figure 2:
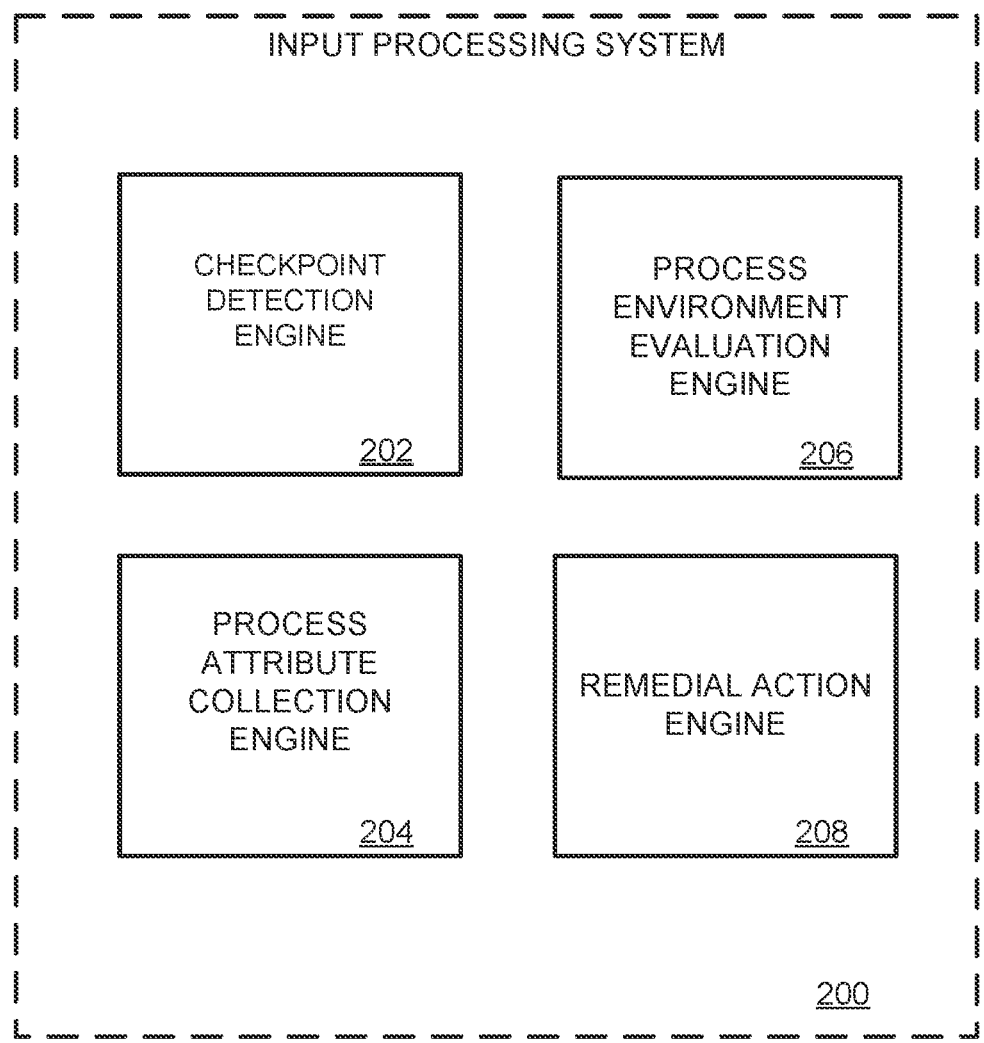
FIG. 2 illustrates an exemplary input processing system for detecting and mitigating stack pivoting exploits as described herein.

FIG. 2 illustrates an overview of an exemplary input system 200 for detecting and mitigating stack pivoting exploits, as described herein. The exploit prevention techniques implemented by input processing system 200 may comprise the processing techniques and content described in FIG. 1. In alternative examples, a distributed system (comprising one or more components such as processor and/or memory) may perform the processing described in system 200.

With respect to FIG. 2, input processing system 200 may comprise checkpoint detection engine 202, process attribute collection engine 204, process environment evaluation engine 206, and remedial action engine 208. Checkpoint detection engine 202 may be configured to determine and/or identify one or more software code and/or process execution checkpoints. In aspects, a set of checkpoints may be determined. The checkpoints may be specific to a file, a file type, an application or service, an operating system or platform, an execution mode, or the like. Alternately, the same set of checkpoints, or a subset of checkpoints from the same group of checkpoints, may be applied to each process. Checkpoint detection engine 202 may detect that a process has reached a checkpoint by monitoring (or otherwise receiving information related to) API hooking, system calls, event logs, etc. API hooking or hooks), as used herein, may refer to techniques used to identify and/or alter the behavior of an operating system or software by intercepting function calls, messages, or events transmitted between software components of a system. As one example, an API hook associated with process creation may intercept a message related to the creation of a process. The API hook may provide the message to checkpoint detection engine 202. Checkpoint detection engine 202 may record the message (or an indication thereof) and/or information related to the corresponding process.

Process attribute collection engine 204 may be configured to collect information about a process. In aspects, process attribute collection engine 204 may be invoked when a checkpoint is reached. Invoking process attribute collection engine 204 may comprise providing at least a process identifying information to process attribute collection engine 204. Upon being invoked, process attribute collection engine 204 may evaluate the process identifying information to determine a process identifier. Process attribute collection engine 204 may use the process identifier to evaluate one or more sources in order to obtain information related to the identified process. Examples of sources may include thread information blocks, process environment blocks, or the like. Evaluating sources may comprise using one or more system APIs to obtain the current context for a thread/process from one or more memory registers. The information obtained for a process may include at least a process/thread identifier, the current stack pointer for one or more execution modes, the stack base pointer, the stack limit pointer, various pointer states and addresses, process/application startup parameters, operating system variables, etc. In aspects, process attribute collection engine 204 may collect data for multiple stack memories (stacks) and/or multiple execution modes. For example, process attribute collection engine 204 may collect process information for a kernel mode stack, a 64-bit mode stack, and a 32-bit mode stack.

Process environment evaluation engine 206 may be configured to evaluate process information. In aspects, process environment evaluation engine 206 may have access to process information collected by attribute collection engine 204. Process environment evaluation engine 206 may evaluate the collected process information using one or more evaluation mechanisms. Evaluating the collected process information may comprise comparing at least a portion of the identified information to one or more threshold values or memory address ranges. For example, process environment evaluation engine 206 may parse the process information to identify the current stack pointer, the stack base pointer, and the stack limit pointer for each stack used by the process. Process environment evaluation engine 206 may compare the current stack pointer address for each execution mode to the respective stack base pointer address and/or a stack limit address or address range. The comparison may involve a determination of whether each current stack pointer address is within the expected range defined by the stack base pointer address and/or a stack limit address. If each current stack pointer is within the respective range, the checkpoint is successfully completed, and execution of the process continues. If one or more of the current stack pointers is outside the bounds of the respective range, an indication of a detected stack pivot exploit may be generated and/or stored for the current checkpoint.

Remedial action engine 208 may be configured to perform one or more actions. In aspects, remedial action engine 208 may receive (or have access to) output generated by process environment evaluation engine 206. Remedial action engine 208 may evaluate the output to determine whether an exploit or other anomalous behavior has been indicated. If an exploit/anomalous behavior has been detected, remedial action engine 208 may perform (or cause the performance of) one or more remedial actions. Examples of remedial actions may include generating and displaying warnings and/or notifications, terminating one or more processes, modifying a set of permissions or privilege levels, quarantining one or more files, initiating (locally or remotely) anti-exploit software/services, etc. In at least one aspect, a warning or notification may be selectively dismissible by a user. Dismissing the warning/notification may enable the process to continue executing. If a warning or notification is ignored by a user or not responded to within a time limit, remedial action engine 208 may automatically terminate the associated process.

Figure 3:
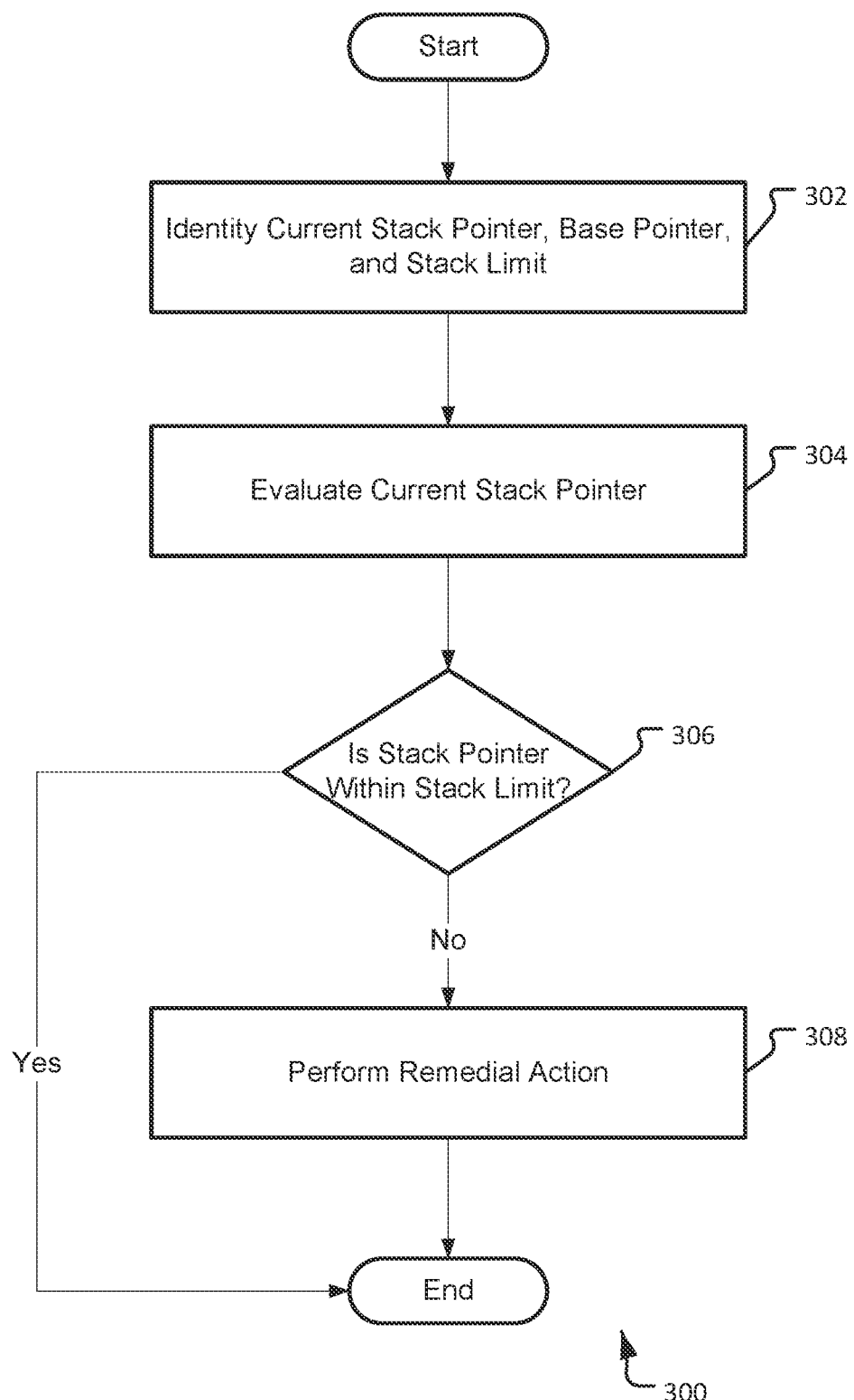
FIG. 3 illustrates an example method for detecting and mitigating stack pivoting exploits as described herein.

FIG. 3 illustrates example methods for determining exploit prevention software settings, as described herein. In aspects, method 300 may be executed by an exemplary system such as system 100 of FIG. 1 and system 200 of FIG. 2. In examples, method 300 may be executed on a device comprising at least one processor configured to store and execute operations, programs or instructions. However, method 300 is not limited to such examples. In other examples, method 300 may be performed by a remote application or service. In yet other examples, method 300 may be executed (e.g., computer-implemented operations) by one or more components of a distributed network, such as a web service or distributed network service (e.g. cloud service).

Example method 300 describes a computing device having access to exploit prevention software. The exploit prevention software may be installed locally on the computing device or may be accessible remotely by the computing device. The exploit prevention software may be configured to implement or utilize software checkpoints in one or more execution modes. For example, the exploit prevention software may use kernel mode callbacks on registry access, thread creation, process creation, library loading, object manager callbacks, etc. Additionally or alternately, the exploit prevention software may use user mode hooks on APIs for memory allocation, memory mapping, memory protection, etc. In aspects, the exploit prevention software may detect when a process has reached a checkpoint by monitoring (or otherwise receiving information related to) API hooking, system calls, event logs, and the like.

Example 300 begins at operation 302 where a current stack pointer, a stack base, and a stack limit are identified. In aspects, when a process is determined to have reached a checkpoint, process information may be identified and/or collected for the process. Identifying the process information may include accessing an information source, such as a thread information block, a process environment block, or a similar data source comprising thread information. Information sources may be stored locally on the computing device, or remotely on one or more computing devices. In examples, the process information may include at least the current stack pointer, the stack base pointer, and the stack limit pointer for each execution mode used to execute the process. As a specific example, a computing device may utilize at least three execution modes: a kernel mode, a 32-bit mode, and a 64-bit mode. Each execution mode may be associated with a specific stack memory (e.g., a kernel stack, a 32-bit stack, and a 64-bit stack). When a process is created on the computing device, a thread information block may be populated for each thread associated with the process. The thread information block may be populated with (or otherwise comprise) the thread information (e.g., error information, version data, process parameters, image name, etc.) associated with a process and/or one or more of the stacks. The computing device may use system APIs and calls to obtain the current context of a thread or process from the thread information block and/or memory registers associated with the process.

At operation 304, the current stack pointer may be evaluated. In aspects, the one or more portions of the identified process information may be evaluated. Evaluating the process information may comprise applying a rule set or evaluation algorithm to the thread information, comparing the thread information to a threshold value or range of values, or providing the thread information to one or more evaluation models. For instance, continuing from the above example, the current stack pointer, the stack base, and the stack limit for the kernel stack, 32-bit stack, and the 64 bit stack may be provided to an evaluation model. The evaluation model may be configured to compare the current stack pointer for each execution mode (e.g., kernel mode, a 32-bit mode, and a 64-bit mode) to the corresponding stack base and/or the stack limit. At decision operation 306, a determination may be made as to whether each current stack pointer is within the range defined by the stack base and the stack limit. For example, for each execution mode, the memory address associated with the current stack pointer may be compared to the stack range (e.g., the range of memory address from the stack base memory address to the stack limit memory address). If the comparison reveals that the memory address for each of the current stack pointers is within the corresponding stack range, the process successfully completes the current checkpoint without detecting a stack pivot exploit, and example method 300 ends. On the other hand, if the comparison reveals that the memory address for at least one of the current stack pointers is outside the corresponding stack range, a stack pivot exploit is detected and flow proceeds to operation 308.

At operation 308, a remedial action may be performed. In aspects, upon detecting a stack pivot exploit, the detecting device may perform, recommend, or schedule remedial action. Examples of remedial actions may include generating and displaying warnings and/or notifications, terminating one or more processes, modifying a set of permissions or privilege levels, quarantining one or more files, initiating (locally or remotely) anti-exploit software/services, etc. As one example, a computing device executing exploit prevention software may detect the stack pivot exploit during process execution. As a result, the computing device may terminate the process and generate a notification explaining the termination. As another example, a remote service executing exploit prevention software may detect the stack pivot exploit on a computing device. As a result, the remote service may suspend the process and generate a warning/notification to a user regarding the potential hazards of the exploit. Additionally, the remote service may provide a selectable control enabling a user to terminate the process or to ignore the warning/notification (thus, resuming the process).

Figure 4:
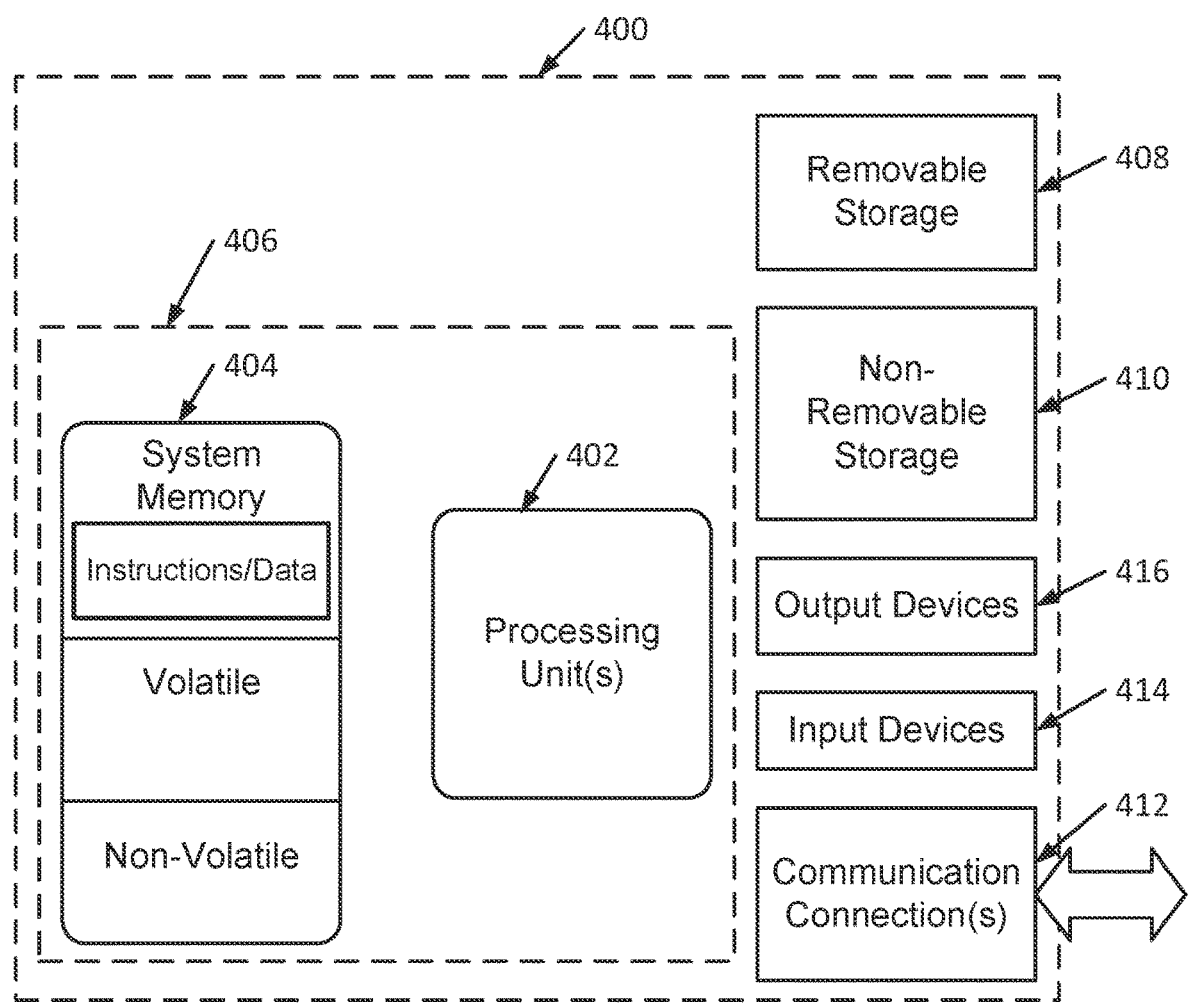
FIG. 4 illustrates one example of a suitable operating environment in which one or more of the present embodiments may be implemented.

FIG. 4 illustrates one example of a suitable operating environment 400 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 400 typically includes at least one processing unit 402 and memory 404. Depending on the exact configuration and type of computing device, memory 404 (storing, among other things, notification data, anti-exploit code/data, instructions to perform the methods disclosed herein, etc.) may be volatile (such as RAM), non-volatile (such as ROM, flash memory, etc.), or some combination of the two. This most basic configuration is illustrated in FIG. 4 by dashed line 406. Further, environment 400 may also include storage devices (removable, 408, and/or non-removable, 410) including, but not limited to, magnetic or optical disks or tape. Similarly, environment 400 may also have input device(s) 414 such as keyboard, mouse, pen, voice input, etc. and/or output device(s) 416 such as a display, speakers, printer, etc. Also included in the environment may be one or more communication connections, 412, such as LAN, WAN, point to point, etc.

Operating environment 400 typically includes at least some form of computer readable media. Computer readable media can be any available media that can be accessed by processing unit 402 or other devices comprising the operating environment. By way of example, and not limitation, computer readable media may comprise computer storage media and communication media. Computer storage media includes volatile and nonvolatile, removable and nonremovable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 400 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system for stack pivot exploit detection and mitigation, comprising:
   a processor; and
   memory storing instructions that, when executed by the processor, causes the system to perform a set of operations for stack pivot detection and mitigation, the set of operations comprising:
      defining, for a process executing in an execution mode, thread information for the process, the thread information comprising a current memory pointer, a memory base, and a memory limit, the memory base and the memory limit defining a memory range for the process;
      based on the current memory pointer for the process executing in the execution mode, generating a corresponding memory base pointer for the memory base, and a corresponding memory limit pointer for the memory limit;
      comparing the current memory pointer for the thread information to the memory base pointer and the memory limit pointer to determine whether the current memory pointer is within the memory range;
      when the current memory pointer is determined to be within the memory range, permitting the process to execute;
      when the current memory pointer is determined to not be within the memory range, determining an occurrence of a stack pivot exploit and, in response, performing a remedial action; and
      executing a series of checkpoints over time, each checkpoint determining the occurrence of the stack pivot, wherein the execution mode comprises a kernel execution mode, a 32-bit execution mode, and a 64-bit execution mode, each, the execution mode having a corresponding series of checkpoints for determining the occurrence of a stack pivot within each execution mode.

2. The system of claim 1, wherein each execution mode has a thread information block storing thread information in a datasource.

3. The system of claim 1, wherein the remedial action comprises at least one of: generating notifications output to a user interface, terminating the process, modifying a set of user permissions associated with the process, and quarantining a file associated with the process.

4. The system of claim 1, wherein comparing the current memory pointer for the thread information to the memory base pointer and the memory limit pointer to determine whether the current memory pointer is within the memory range comprises:
   comparing a memory address for the current memory pointer to the memory range, the memory range comprising a range of memory addresses from the memory address for the memory base pointer and the memory address for the memory limit pointer to determine whether the memory address for the current memory pointer is within the range of memory addresses.

5. The system of claim 1, wherein each checkpoint of the series of checkpoints is specific to a file or file type.

6. A method for stack pivot exploit detection and mitigation, comprising:
   defining, for a process executing in an execution mode, thread information for the process, the thread information comprising a current memory pointer, a memory base, and a memory limit, the memory base and the memory limit defining a memory range for the process;
   based on the current memory pointer for the process executing in the execution mode, generating a corresponding memory base pointer for the memory base, and a corresponding memory limit pointer for the memory limit;
   comparing the current memory pointer for the thread information to the memory base pointer and the memory limit pointer to determine whether the current memory pointer is within the memory range;
   when the current memory pointer is determined to be within the memory range, permitting the process to execute;
   when the current memory pointer is determined to not be within the memory range, determining an occurrence of a stack pivot exploit and, in response, performing a remedial action; and
   executing a series of checkpoints over time, each checkpoint determining the occurrence of the stack pivot, wherein the execution mode comprises a kernel execution mode, a 32-bit execution mode, and a 64-bit execution mode, each execution mode having a corresponding series of checkpoints for determining the occurrence of a stack pivot within each execution mode.

7. The method of claim 6, wherein each execution mode has a thread information block storing thread information in a datasource.

8. The method of claim 6, wherein the remedial action comprises at least one of: generating notifications output to a user interface, terminating the process, modifying a set of user permissions associated with the process, and quarantining a file associated with the process.

9. The method of claim 6, wherein comparing the current memory pointer for the thread information to the memory base pointer and the memory limit pointer to determine whether the current memory pointer is within the memory range comprises:
comparing a memory address for the current memory pointer to the memory range, the memory range comprising a range of memory addresses from the memory address for the memory base pointer and the memory address for the memory limit pointer to determine whether the memory address for the current memory pointer is within the range of memory addresses.

10. The method of claim 6, wherein each checkpoint of the series of checkpoints is specific to a file or file type.

11. A computer storage device storing instructions that, when executed, are capable of performing a method for stack pivot exploit detection and mitigation, the method comprising:
defining, for a process executing in an execution mode, thread information for the process, the thread information comprising a current memory pointer, a memory base, and a memory limit, the memory base and the memory limit defining a memory range for the process;
based on the current memory pointer for the process executing in the execution mode, generating a corresponding memory base pointer for the memory base, and a corresponding memory limit pointer for the memory limit;
comparing the current memory pointer for the thread information to the memory base pointer and the memory limit pointer to determine whether the current memory pointer is within the memory range;
when the current memory pointer is determined to be within the memory range, permitting the process to execute;
when the current memory pointer is determined to not be within the memory range, determining an occurrence of a stack pivot exploit and, in response, performing a remedial action; and
executing a series of checkpoints over time, each checkpoint determining the occurrence of the stack pivot, wherein the execution mode comprises a kernel execution mode, a 32-bit execution mode, and a 64-bit execution mode, each execution mode having a corresponding series of checkpoints for determining the occurrence of a stack pivot within each execution mode.

12. The computer storage device of claim 11, wherein each execution mode has a thread information block storing thread information in a datasource.

13. The computer storage device claim 11, wherein the remedial action comprises at least one of: generating notifications output to a user interface, terminating the process, modifying a set of user permissions associated with the process, and quarantining a file associated with the process.

14. The computer storage device claim 11, wherein each checkpoint of the series of checkpoints is specific to a file or file type.

* * * * *